No. 778,040. PATENTED DEC. 20, 1904.
L. HOLLAND-LETZ.
SNAPPING ROLLS FOR CORN HUSKING MACHINES.
APPLICATION FILED AUG. 26, 1904.
NO MODEL.
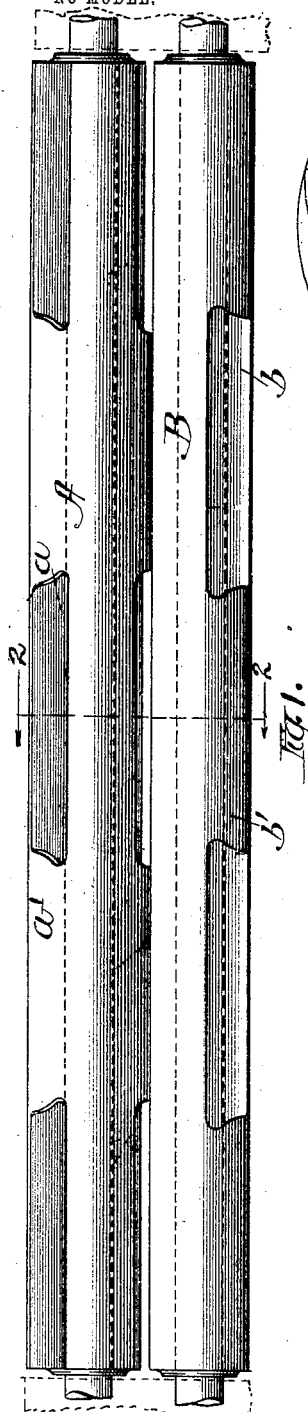

No. 778,040. Patented December 20, 1904.

UNITED STATES PATENT OFFICE.

LOUIS HOLLAND-LETZ, OF CHICAGO, ILLINOIS, ASSIGNOR TO INTERNATIONAL HARVESTER COMPANY, A CORPORATION OF NEW JERSEY.

SNAPPING-ROLLS FOR CORN-HUSKING MACHINES.

SPECIFICATION forming part of Letters Patent No. 778,040, dated December 20, 1904.

Application filed August 26, 1904. Serial No. 222,221.

*To all whom it may concern:*

Be it known that I, LOUIS HOLLAND-LETZ, a citizen of the United States, residing at Chicago, in the county of Cook and State of Illinois, have invented a new and useful Improvement in Snapping-Rolls for Corn-Husking Machines, of which the following is a complete specification.

This improvement relates to the feeding-rollers, which snap the ears of corn from the stalks, and is designed more particularly for use on corn huskers and shredders when operating upon popcorn.

The object of the invention is to construct a pair of rollers which will remove the ears from the stalks without crushing the ear and shelling the corn and which will also feed the stalks to the shredding and husking mechanism.

The novel feature lies in the cam-surfaces as formed and arranged on the opposing rollers, as set forth in the accompanying drawings, in which—

Figure 1 represents a pair of coöperating snapping-rollers. Fig. 2 is an enlarged transverse section of the rollers, taken as indicated by the line 2 2 on Fig. 1; and Fig. 3 is a diagrammatic view in section designed to show the form and construction of the cam-surfaces.

In the drawings, A designates the larger of the two coöperating snapping-rollers, and B the smaller one. The roller A is provided with the lineally-arranged cam-surfaces $a$ and the interrupted portions $a'$, being of substantially the length of the cam-surfaces $a$. Preferably three series of these cam-surfaces are disposed equidistantly upon the periphery of the larger roller. The small roller B is provided with preferably two sets of similar cam-surfaces $b$, also lineally arranged in sets on opposite sides of the roller and with the interrupted portions $b'$, which are of a length substantially that of the cam-surfaces $b$. The cam-surfaces $a$ on the rollers A are alternately placed with respect to the cam-surfaces $b$ on the roller B, so that each cam-surface is opposed to and coöperates with the normal or regular surface on the opposing roller.

The advancing edge of each cam-surface is characterized by a well-defined margin followed by a sharp depression which gradually recedes from the center outwardly and rearwardly until it merges into the normal surface of the cylinder. Each cam-surface is preferably formed by a line moving parallel to the axis of the roller and in arcs of circles, as shown in Fig. 3. $x$, $y$, and $z$ represent the respective centers of the circles of said arcs, the center $y$ being preferably coincident with the center of the roller.

Referring to Fig. 3, which shows diagrammatically the construction of the cam-surfaces, the numeral 1 designates the margin of the advancing edge of the cam-surface which forms the angular lip, as shown. Extending from 1 there is a sharp depression, (represented by the arc 1 2 of the circle whose center is at $x$.) From the point 2 there is preferably a small portion of the cam-surface concentric with the center of the cylinder $y$, which extends from the said point 2 to the point 3, from which point it gradually recedes outwardly and rearwardly until it merges into the surface of the cylinder at the point 4, this arc 3 4 being drawn about the center $z$. There is thus formed a series of cam-surfaces each having a well-defined margin which forms the advancing angular lip, followed by a sharp depression operatively in the rear thereof, and the gradually-receding surface, which merges into the normal surface of the cylinder. This peculiar form of cam-surface will enable the rollers, one of which is yieldingly placed with respect to the other, to grasp the stalk of corn and feed it between the coöperating rollers until the ear is engaged by one of the cam-surfaces $a$ or $b$, and as the cam-surfaces continue to advance in the direction indicated by the arrows it will snap the ear from the stalk. The gradually-receding portion of the cam engages the butt of the ear, and thus prevents crushing or shelling of same. The fact that the cam-surfaces are alternately disposed or staggered with respect to each other will operate to hold the rollers at all times in normal working position, permitting them to run smoothly, while the cam-surfaces provide sufficient openings to engage the stalks. The upper roller A is made, preferably, larger than the lower one, so that in operation it may give an initial downward movement to the ears which have been snapped off.

What I claim as my invention, and desire to secure by Letters Patent, is—

1. In a corn-husking machine, in combination, a pair of coöperating snapping-rollers each roller being provided with lineally-arranged interrupted cam-surfaces alternately disposed with respect to the cam-surfaces on the coacting roller, the said cam-surfaces having a greater longitudinal than peripheral extent, substantially as and for the purpose set forth.

2. In a corn-husking machine, in combination, a pair of coöperating snapping-rollers each roller being provided with lineally-arranged interrupted cam-surfaces alternately disposed with respect to the cam-surfaces on the coacting roller and each of said cam-surfaces being comprised of a sharp depression which gradually recedes outwardly and rearwardly until it merges into the normal surface of the cylinder and with a greater longitudinal than peripheral extent, substantially as and for the purpose set forth.

3. In a corn-husking machine, in combination, a pair of coöperating snapping-rollers each roller being provided with lineally-arranged interrupted cam-surfaces alternately disposed with respect to the cam-surfaces on the coacting roller and each of said cam-surfaces being comprised of an angularly-formed biting-lip, a sharp depression operatively in the rear thereof which gradually recedes outwardly and rearwardly until it merges into the normal surface of the cylinder, substantially as and for the purpose set forth.

4. In a corn-husking machine, in combination, a pair of coöperating snapping-rollers each roller being provided with lineally-arranged interrupted cam-surfaces alternately disposed with respect to the cam-surfaces on the coacting roller each of said cam-surfaces being comprised of three intersecting cylindrical surfaces which collectively form an angular lip, a sharp depression adjacent thereto, a surface extending rearwardly from said depression substantially concentric with the surface of the roller and a surface extending rearwardly and receding outwardly until it merges into the normal surface of the cylinder, substantially as and for the purpose set forth.

LOUIS HOLLAND-LETZ.

Witnesses:
RAY D. LEE,
W. F. PROUSA.